United States Patent
Lalor

[11] Patent Number: 5,983,551
[45] Date of Patent: Nov. 16, 1999

[54] REMOTE CONTROLLED APPARATUS AND METHOD FOR TRAINING RETRIEVING DOGS

[76] Inventor: Tom Lalor, 2694 Haywood Avenue, West Vancouver, B.C., Canada, V7V 1Y6

[21] Appl. No.: 09/035,972

[22] Filed: Mar. 6, 1998

[51] Int. Cl.[6] ................................................. F41C 27/06
[52] U.S. Cl. .............................. 42/105; 119/29; 119/720
[58] Field of Search ............................... 42/105; 89/1.8, 89/1.34; 102/349; 119/908, 720, 721

[56] References Cited

U.S. PATENT DOCUMENTS

| | | | |
|---|---|---|---|
| 3,112,669 | 12/1963 | Damblanc | 89/1.8 |
| 3,367,232 | 2/1968 | Aldrin | 89/1.8 |
| 3,431,820 | 3/1969 | Chinn et al. | 42/105 |
| 3,516,628 | 6/1970 | Kendall | 89/1.8 |
| 3,570,365 | 3/1971 | Bornand | 89/1 |
| 3,643,545 | 2/1972 | Nahas | 89/1 |
| 4,098,015 | 7/1978 | Walbe | 42/1 |
| 4,181,911 | 1/1980 | Black | 343/225 |
| 4,307,529 | 12/1981 | White et al. | 42/1 |
| 5,042,390 | 8/1991 | Schotter | 102/504 |
| 5,291,680 | 3/1994 | Schabdach | 42/105 |
| 5,396,830 | 3/1995 | Kornblith et al. | 89/1.34 |
| 5,592,770 | 1/1997 | Gudgel | 42/105 |

Primary Examiner—Charles T. Jordan
Assistant Examiner—Denise J Buckley
Attorney, Agent, or Firm—Hoffman, Wasson & Gitler

[57] ABSTRACT

This invention relates to a remote controlled apparatus and method for training retrieving and other hunting dogs and replaces all functions field assistants would normally perform during training. These functions include throwing multiple birds and retrieving dummies from different locations, in various directions and at various heights and angles, a gun shot sound, visual and audible assistance for the dog and protecting stored birds and retrieving dummies from the inexperienced dog. The apparatus is low in profile, light weight and portable so that a single trainer can transport, setup and control the training procedure without the need of assistants. Numerous safety features have been developed which limit the possibility of accidental injury.

39 Claims, 12 Drawing Sheets

REMOTE CONTROLLED APPARATUS AND METHOD FOR TRAINING RETRIEVING DOGS

FIELD OF THE INVENTION

This invention relates to a remote controlled apparatus and method for training dogs including flushing/pointing dogs such as pointers, spaniels and setters and retrieving dogs such as Labradors, retrievers and chesapeakes.

BACKGROUND OF THE INVENTION

In the field of training retrievers and other hunting dogs for competition and hunting, a great amount of time is taken up by dog owners preparing their dogs to perform at peak efficiency. It is the usual practice for a dog owner to hire one or more field assistants to help in the training regime. Field assistants stand remote from the dog and trainer and throw or launch retrieving dummies or birds into the air. A gun shot sound is made and the dog is sent out to retrieve the bird or dummy. The assistants are sometimes required to provide either a verbal or a visual aid to help the dog locate the bird or retrieving dummy and carry out the retrieval task. They may also have to protect stored birds or retrieving dummies from being chewed or retrieved by younger inexperienced dogs. The hiring of field assistants can be a very costly endeavour for the dog trainer.

In prior attempts to provide alternatives to the hiring of assistants, devices have been developed that are either ineffective in replacing all of the characteristics noted above or are so difficult and time consuming to transport and set up that they do not provide any savings in time or expense.

Presently there are devices which launch retrieving dummies remotely, as described for example in U.S. Pat. No. 4,307,529 to White et al. which discloses a remote controlled retrieving dummy launching device that uses a power handle mechanism to launch cylindrical retrieving dummies from a tripod mounted housing. The device described by White launches a single retrieving dummy in one direction and is triggered remotely by radio signals. Even though White does provide for the sequential firing of several launchers connected together, White does not permit the selective firing of launchers placed at different locations. Further, the launchers described by White are heavy, making it difficult for a single operator to carry multiple launchers into the field without assistance. In addition, no provisions are made by White for launching both birds and retrieving dummies, there is no audible or visual aid to assist the dog in performing the retrieval task and no method is described for protecting retrieving dummies from inappropriate access by the inexperienced dog.

In order to replace the need for hiring multiple human field assistants an apparatus and method for training retrieving dogs must duplicate all activities performed by these assistants and do so at less cost to the dog trainer. Therefore, it would be desirable that the device: 1) be able to launch both birds and retrieving dummies remotely and accurately; 2) provide a signal sound if required in order to render assistance to young dogs learning to locate the position of the launch; 3) provide a gun shot on launch to attract the attention of the dog; 4) be adjustable so that launch height, angle, distance and direction may be varied and provide bi-directional launches from a single station; 5) have the capability of launching multiple retrieving dummies or birds from one or from multiple locations; 6) be designed to prevent an untrained dog from removing or chewing the unlaunched birds or retrieving dummies; 7) be low in profile to limit the possibility that the dog will see the device in the field; 8) be compact and light weight so that one person be able to carry at least three multiple launch devices having at least four possible launches per station, therefore enabling the training of multiple dogs in different geographic locations or permitting repeat launches from the same location while training a single dog; 9) have the capability to simulate an assistant who moves out of sight after throwing a bird or retrieving dummy; 10) provide launchers and a remote controlled transmitter with multiple, selectable transmission codes to permit multiple trainers to operate in the same geographic area without interfering with one another; 11) provide the capability of launching retrieving dummies or birds from up to four different locations and permit up to six multiple launch devices to be connected in series at each location to allow up to 24 retrieving dummies or birds to be launched from each location; 12) incorporate numerous safety features such as, a launch signal which requires the matching of multiple control codes and firing sequences, safety logic and control so that frequencies such as those produced by dog training collars, garage openers, model airplanes, etc. will not trigger a launch, the ability for users to check control codes and change them if required, and a safety kill switch on both the launch devices and the remote control unit.

SUMMARY OF THE INVENTION

It is therefore an object of a preferred embodiment of the present invention to provide a remote controlled apparatus and method for training retrieving dogs that replaces the functions normally carried out by field assistants, thereby providing a total training solution that is both practical, flexible, inexpensive and time saving.

In accordance with another preferred embodiment of the present invention, it is an object of the present invention to provide a remote controlled apparatus and method for training retrieving dogs that can launch multiple retrieving dummies and birds from multiple locations, in different directions and at different angles and distances.

In accordance with yet another preferred embodiment of the present invention, it is another object of the present invention to provide a remote controlled apparatus and method for training retrieving dogs that permits adjustment of the angle, height and distance of projection of both training dummies and birds and permits adjustment for different launch surfaces.

In accordance with yet another preferred embodiment of the present invention, it is still another object of the present invention to provide a remote controlled apparatus and method for training retrieving dogs that can provide a gun shot sound on launch as well as both an audible and a visual assist to help the dog locate the launched retrieving dummy or bird.

In accordance with yet another preferred embodiment of the present invention, it is another object of the present invention to provide a remote controlled apparatus that is low in profile so that a dog is less likely to see the apparatus in the field.

In accordance with yet another preferred embodiment of the present invention, it is a yet another object of the present invention to provide a remote controlled apparatus and method for training retrieving dogs that functions to prevent the inexperience dog from removing and chewing training dummies or birds from the launch device before they are launched.

In accordance with yet another preferred embodiment of the present invention, it is a further object of the present invention to provide a remote controlled apparatus and method for training retrieving dogs that is compact and light weight so that up to four devices may be carried and setup quickly in up to four different retrieving or flushing locations by a single operator.

In accordance with yet another preferred embodiment of the present invention, it is another object of the present invention to provide a remote controlled apparatus and method for training retrieving dogs that permits multiple users to operate in the same geographic area without interfering with one another.

In accordance with yet another preferred embodiment of the present invention, it is a still further object of the present invention to provide a remote controlled apparatus and method for training retrieving dogs that has numerous safety features to prevent the accidental launching of birds or bumpers.

According to the present invention, there is provided a remote controlled launcher for training retrieving and hunting dogs using launch mechanisms of the type formed with a firing chamber, firing pin means, trigger means for actuating the firing pin means for firing a blank cartridge placed in the firing chamber and a launch barrel designed for explosive release of gas from a blank cartridge for launching a retrieving dummy or bird mounted on the launch barrel comprising: a ground engaging frame means; a plurality of support means connected to said frame means, said support means supporting a plurality of said launch mechanisms with said launch barrels directed away from said frame means, said support means being individually pivotable with respect to said frame means for directing said plurality of said launch mechanisms in a plurality of directions and angles; a plurality of trigger control means mounted to said frame means for controlling and releasing said trigger means, comprising trigger servomotor means and arm means coupled to said trigger servomotor means for engaging said trigger means; whereby retrieving dummies or birds mounted on said launch barrels may be sequentially explosively launched in a plurality of directions by signals transmitted from a remote location by controlling current to said trigger servomotor means in response to said transmitted signals.

According to the present invention, there is further provided a method of training retrieving and hunting dogs comprising the steps of: positioning, in a remote location, a remote controlled launcher using launch mechanisms of the type formed with a firing chamber, firing pin means, trigger means for actuating the firing pin means for firing a blank cartridge placed in the firing chamber and a launch barrel designed for explosive release of gas from a blank cartridge for launching a retrieving dummy or bird mounted on the launch barrel comprising: a ground engaging frame means, a plurality of support means connected to said frame means, said support means supporting a plurality of said launch mechanisms with said launch barrels directed away from said frame means, said support means being individually pivotable with respect to said frame means for directing said plurality of said launch mechanisms in a plurality of directions and angles, and a plurality of trigger control means mounted to said frame means for controlling and releasing said trigger means, comprising trigger servomotor means and arm means coupled to said trigger servomotor means for engaging said trigger means; mounting retrieving dummies or birds on said launch barrels; and transmitting signals from a remote location to sequentially control current to said trigger servomotor means to thereby sequentially explosively launch said retrieving dummies or birds.

In a preferred embodiment of the present invention there is provided a remote controlled multiple launch device that is capable of launching up to four retrieving dummies or birds in two different directions and at different adjustable angles and heights. The launch devices of the present invention are low in profile to reduce visibility in the field and light weigh so that a single operator can carry up to four at a time. The launch devices can be connected together in series of up to six per location, at up to four different locations, for a total of up to 96 launches in total, all controllable by a single operator using a single hand held electronic remote control unit that sends radio signals to programmable electronic receiver units connected to each launch device. The launch devices use launch mechanisms of the type formed with a firing chamber, firing pin, trigger for actuating the firing pin for firing a blank cartridge placed in the firing chamber and a launch barrel designed for explosive release of gas from a blank cartridge for launching a retrieving dummy or bird mounted on the launch barrel. The launch trajectory of the retrieving dummies or birds is adjustable for height, distance and angle and the launch devices have protective plastic tubes that can be placed over the launch barrel to prevent dogs from taking or chewing un-launched retrieving dummies. Both the remote control units and the receiver units are programmable to permit multiple trainers to operate in the same geographic location without interfering with one another. The present invention also includes a speaker located on the receiver unit and a remote artificial human image controlled by the remote control unit which provides the dog with audible and visual assistance in locating launched birds or retrieving dummies. The present invention includes numerous safety features to prevent accidental launches and operator injury. The above-described features of the present invention are designed to replace those services normally provided by human assistants hired by the dog owner in the training of retrieving and other hunting dogs.

Other advantages, objects and features of the present invention will be readily apparent to those skilled in the art from a review of the following detailed descriptions of a preferred embodiment in conjunction with the accompanying drawings and claims.

BRIEF DESCRIPTION OF THE DRAWINGS

Preferred embodiments of the present invention will now be described and will be better understood when read in conjunction with the accompanying drawings, in which.

Similar reference numerals are used in the Figures to denote similar components.

DETAILED DESCRIPTION OF THE INVENTION

Figure 5:
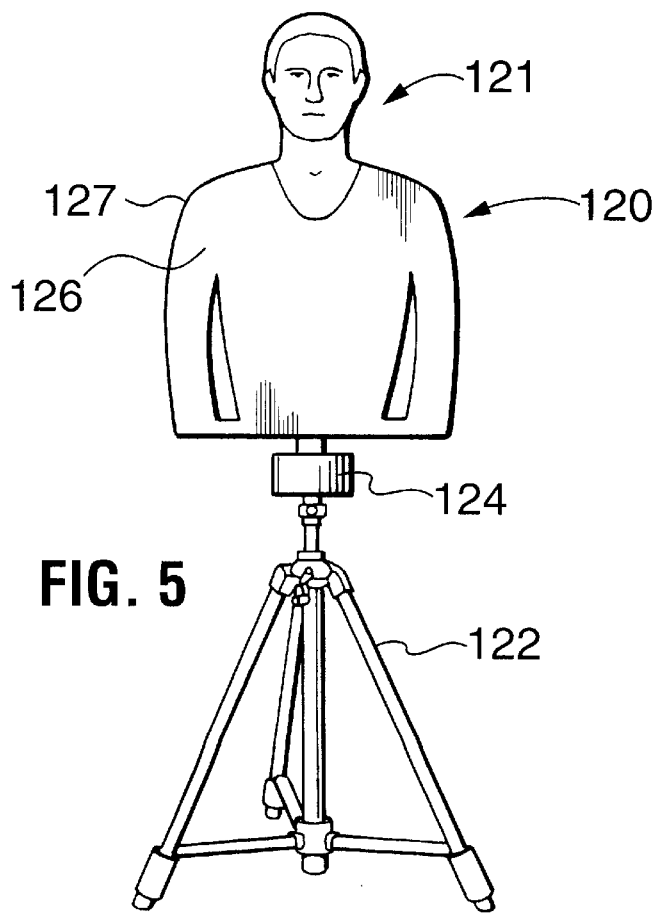
FIG. 5 is a perspective view of one embodiment of a remote artificial human image of the present invention.
Figure 6:
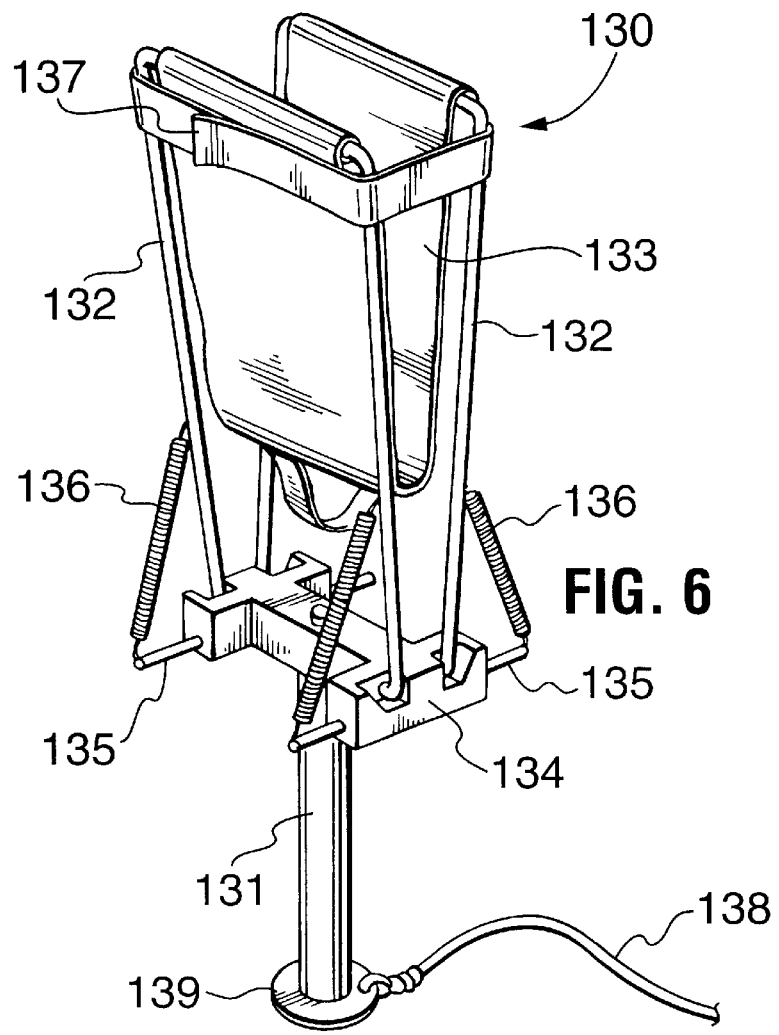
FIG. 6 is a perspective view of one embodiment a bird retaining basket of the present invention.
Figure 7:
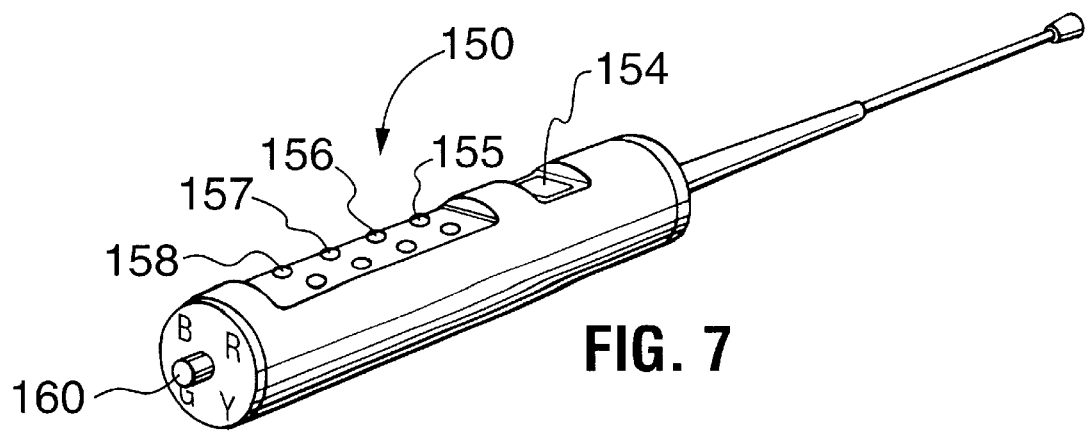
FIG. 7 is a perspective view of one embodiment of an electronic remote control unit of the present invention.

As shown in FIGS. 1 through 9, the herein described remote controlled apparatus and method for training retrieving and hunting dogs comprises up to 24 remote controlled multiple launch devices 10, each comprising a tubular base frame 20, a launch support 40, four multiple launch mechanisms 50 and an electronic receiver unit 170; retrieving dummies 100 (FIG. 4); protective tubes 110 (FIG. 9); remote artificial human figures 120 (FIG. 5); bird retaining baskets 130 (FIG. 6); and an electronic remote control unit 150 (FIG. 7).

The multiple launch devices 10 of the present invention will now be described in detail by reference to FIGS. 1 and 2. Launch device 10 comprises a tubular base frame 20 generally rectangular in shape and low in height so as to limit its visibility in the field. Base frame 20 comprises two parallel spaced apart elongated tubular leg members 22 and 23 and two parallel spaced apart connecting tubular cross members 24 and 25 oriented perpendicular to leg members 22 and 23. Each of leg members 22 and 23 has a central straight portion 26 and downward bending portions 30 at each end forming legs 31. Each leg 31 is equipped with a swivel base 34 and is telescopically adjustable for uneven terrain and for controlling the angle of launch. Parallel connecting cross members 24 and 25 are spaced apart between straight portions 26 of leg members 22 and 23 and are attached at right angles between the ends of straight portions 26 thus forming a sturdy rectangular frame. A flat metal brace 36 is connected between connecting cross members 24 and 25, parallel to leg members 22 and 23. One end of brace 36 is connected to connecting cross member 24 at the mid-point between leg members 22 and 23 and the other end of brace 36 is connected to connecting cross member 25 at the mid-point between leg members 22 and 23.

Each launch device 10 of the present invention has the capability of launching four retrieving dummies or birds in two different directions and at two different launch angles. Launch device 10 therefore has four launch mechanisms 50, each comprising a firing pin assembly 60, a trigger mechanism 70, a firing chamber 80 and a stainless steel launch barrel 90 (see FIG. 3). Constructing the launch barrel of stainless steel is highly preferred since it prevents the build up of residue caused by the reaction of gunpowder and aluminum which can cause a reduction in performance. Launch barrels 90 may also have o-ring seals 91 to prevent back release of exploding gas, thereby confining the gas for launch of the retrieving dummy 100 or bird.

Launch mechanisms 50 are supported on a split launch support 40 comprising two support plates 41 and 42. Launch mechanisms 50 are arranged in an equally spaced apart rectangular pattern. Support plate 41 supports two launch mechanisms 50 and is pivotably attached by cast hinges 43 to connecting cross member 24 of base frame 20. Support plate 42 supports two launch mechanisms 50 and is pivotably attached by cast hinges 44 to connecting cross member 25 of base frame 20.

Support plates 41 and 42 are pivotable on cross members 24 and 25 respectively in order to adjust the angle of launch and to allow access to the firing chamber 80 for loading and reloading. The incline angle θ of support plate 41 and the incline angle β of support plate 42 can be independently adjusted and locked to permit two launches in one direction and another two launches in a different direction from the same launch device 10. Angles θ and β are adjusted and locked using threaded support bolts 45 inserted through holes 49 in support plates 41 and 42 and pivotably connected to brace 36 near the mid-point of brace 36. Upper wing nuts 46 and lower wing nuts 47 are threaded on support bolts 45 and support plates 41 and 42 are sandwiched between lower wing nut 47 and upper wing nut 46. Launch springs 55 are situated between lower wing nuts 47 and support plates 41 and 42 to provide some absorption of the recoil force associated with launching a retrieving dummy or bird from launch device 10.

Figure 1:
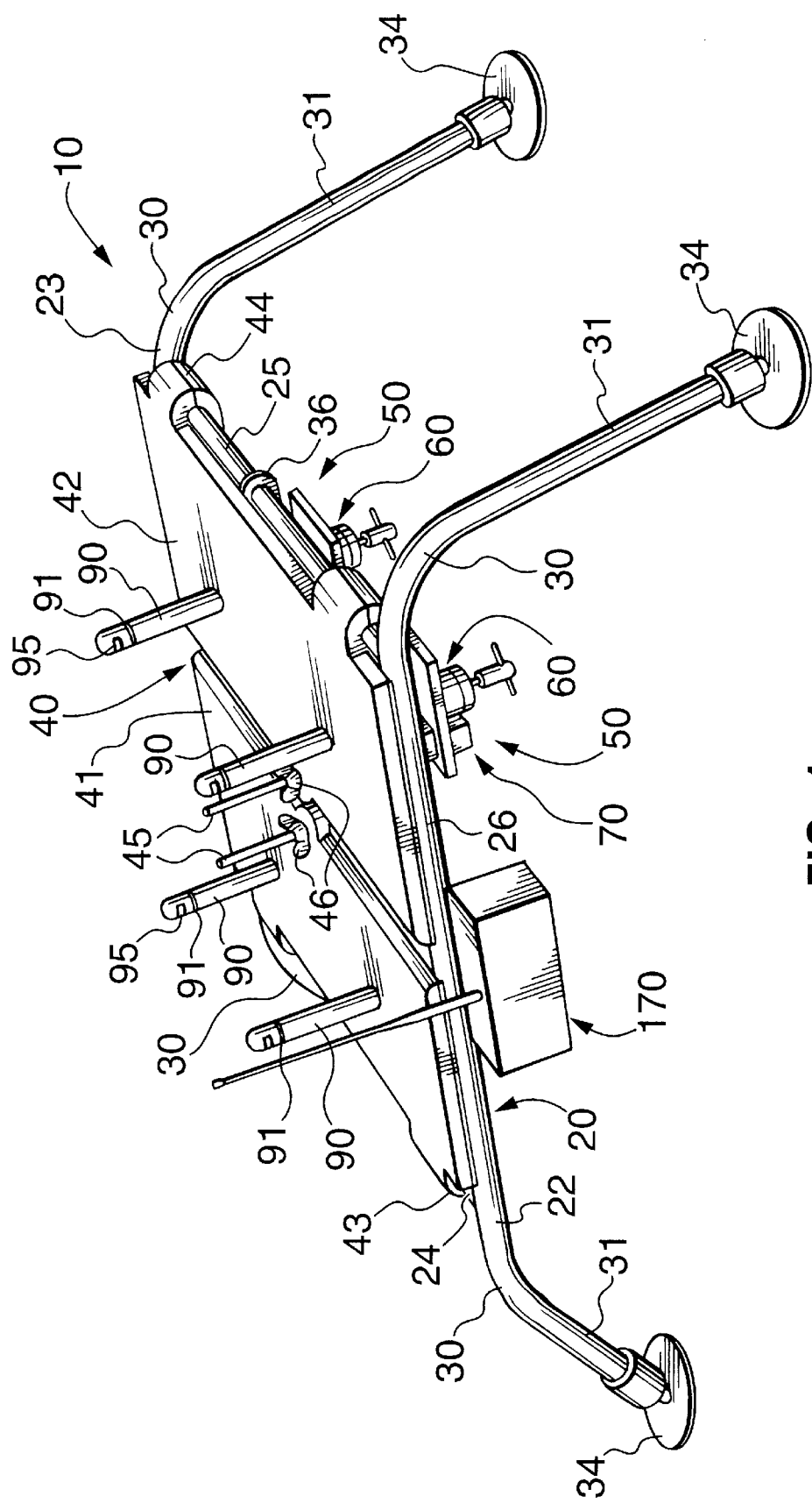
FIG. 1 is a perspective view of one embodiment of a multiple launch device of the present invention with attached electronic receiver unit.

Referring to FIG. 1, base frame 20 and legs 31 are constructed so that the two back legs are longer than the two front legs creating a downward slope of approximately 20 degrees from the horizontal when all legs 31 are telescopically adjusted to their lowest position and launch device 10 is placed on level ground. When support plates 41 and 42 are in a closed position as shown in FIG. 1, with launch device 10 on level ground, and all legs 31 adjusted to their lowest level, the angle of launch support 40 to the horizontal determines the angle and thus the distance of flight of retrieving dummies or birds launched from launch device 10. In the configuration show in FIG. 1, a retrieving dummy will be projected 18 yards laterally from launch device 10. The distance 18 yards is significant since it is the standard for most field trials. By adjusting legs 31 and support plates 41 and 42 the angles of flight can be changed so that launch device 10 is capable of launching retrieving dummies or birds in up to two different directions and at up to two different launch angles.

Although not shown in the embodiments of the present invention depicted in the attached drawings, the applicant expects that those skilled in the art will readily appreciate that multiple support plates mounted to base frame 20, in excess of the two shown herein, could be used in the present invention to support four or more launch mechanisms 50. Each support plate, independently, hingedly attached to base frame 20 could thus be used to support one or more launch mechanisms 50, thereby providing the present invention with the capability of launching more than four birds or retrieving dummies in more than two directions. For example, each of support plates 41 and 42 could be split into two parts, each part supporting one launch mechanism 50 and each part independently, hingedly attached to base frame 20. This would provide the present invention with the capability of launching four birds or retrieving dummies in up to four different directions.

Figure 3:
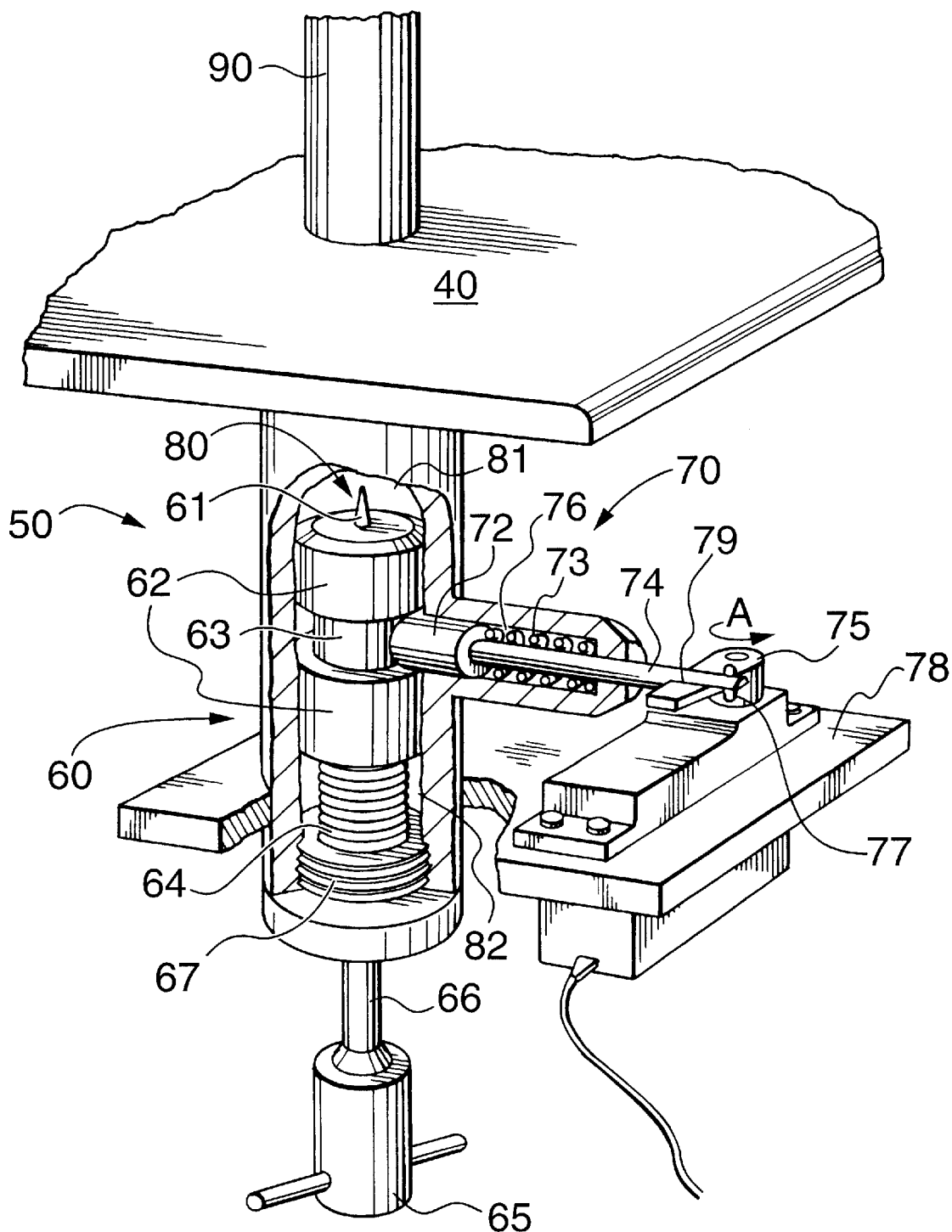
FIG. 3 is a perspective, partially sectional view of the embodiment of FIGS. 1 and 2 showing the firing pin assembly, the firing chamber and the trigger mechanism.
Figure 9:
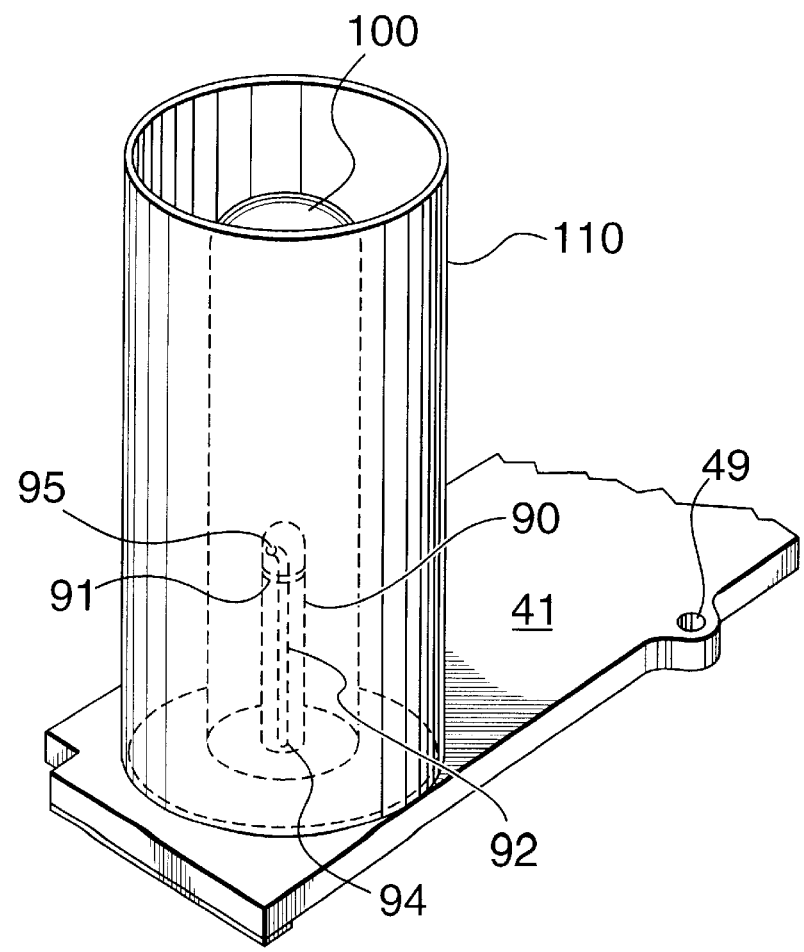
FIG. 9 is a perspective view of one embodiment of the present invention showing a protective plastic tube in position on the launch support over the launch barrel and retrieving dummy.

Referring to FIG. 3, each launch mechanism 50 comprises a firing pin assembly 60, a trigger mechanism 70 and a firing chamber 80 located on the underside of launch support 40 and a launch barrel 90 extending vertically above and at a right angle to launch support 40. Referring to FIG. 9, each launch barrel 90 has an axial bore 92 through the centre. One end of bore 92 has an entrance 94 that opens into firing chamber 80 and the other end has an exit 95 that is sloped at a 45 degree angle from the central axis of launch barrel 90. Exit 95 is directed toward the receiver unit 170, away from the loading area of launch device 10, so that explosive gas from the accidental detonation of a blank cartridge loaded in the firing chamber 80 is safely directed away from the operator.

Firing chamber 80 has a front portion 81 that accepts a blank rifle cartridge and a back portion 82 containing firing pin assembly 60. Back portion 82 of firing chamber 80, firing pin assembly 60 and trigger mechanism 70 are hingedly attached (not shown) as a unit to the underside of launch support 40 such that they can be separated as a unit from the front portion 81 of firing chamber 80 for loading and extracting the blank rifle cartridge.

Firing pin assembly 60 comprises a shaft 66 and an enlarged cylindrical head 62 supporting a firing pin 61. Head 62 slidably fits into the back portion of firing chamber 80 and shaft 66 extends through a sleeve 67 threadably attached to the back of firing chamber 80. Shaft 66 is connected to a handle 65 that is used to retract firing pin assembly 60 against a spring 64 in the back portion of firing chamber 80. Head 62 has a circumferential keyway 63 that accepts the head 72 of a spring loaded trigger pin 74 of trigger mechanism 70 as described below, thereby providing a means for cocking the firing pin assembly 60 in a "ready to fire" position.

Trigger mechanism 70 comprises a cylindrical trigger chamber 76 oriented perpendicular to the central axis of firing chamber 80 and open at one end into firing chamber 80. The other end of trigger chamber 76 has a cylindrical opening that slidably accepts a trigger pin 74. One end of trigger pin 74 has an enlarged head 72 that slides within trigger chamber 76 under the force of spring 73. The other end of trigger pin 74 has a post 77 extending beyond the outside diameter of trigger pin 74, parallel to the central axis of firing chamber 80.

Trigger mechanism 70 also includes an arm 75 attached to a trigger servomotor 78 controlled by signals from electronic receiver unit 170. The end of trigger pin 74 containing post 77 has a flat spot 79 that rests on arm 75. Arm 75 is perpendicular to both trigger pin 74 and post 77. Activation of trigger servomotor 78 causes arm 75 to rotate counter clockwise in the direction of arrow A thereby engaging post 77 and moving trigger pin 74 and head 72 away from firing chamber 80 and out of keyway 63.

To load and cock the launch mechanism 50 a blank rifle cartridge is placed into the front portion 81 of firing chamber 80. Firing chamber 80 is hinged closed and spring loaded firing assembly 60 is cocked by pulling down on handle 65. Trigger spring 73 forces head 72 of trigger pin 74 into keyway 63 as the firing pin assembly 60 is retracted against spring 64 to align keyway 63 with trigger chamber 76. In this position, the firing pin assembly is cocked and "ready to fire".

On the receipt of a properly sequenced firing code from transmitter 152, receiver unit 170 sends a signal to trigger servomotor 78 which operates to rotate arm 75 in the direction of arrow A. This motion is repeated twice by trigger servomotor 78 ensuring that head 72 of trigger pin 74 is pulled out of keyway 63 allowing firing pin 61, under the force of spring 64, to impact the back of a blank cartridge in the front portion 81 of firing chamber 80 causing detonation of the blank cartridge and an explosive release of gas into the bore 92 of launch barrel 90. The gas is explosively released from the exit 95 of launch barrel 90 resulting in the launch of a retrieving dummy 100 or bird mounted on the end of launch barrel 90.

Figure 4:
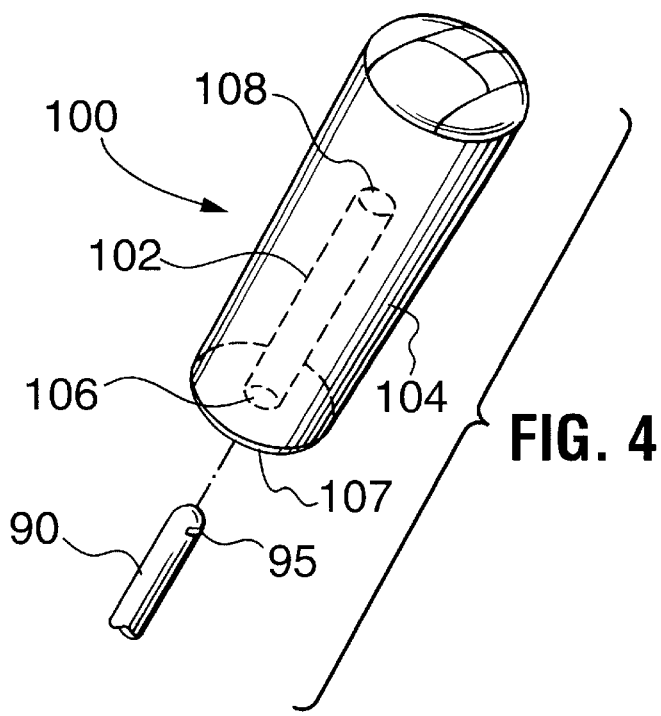
FIG. 4 is a perspective, partially exploded view of one embodiment of a retrieving dummy of the present invention, just following launch.

FIG. 4 shows a retrieving dummy 100 comprising a metal pipe 102 surrounded by a soft padding material 104 having a leather, canvas or vinyl covering. Metal pipe 102 is open at the lower exposed end 106 and closed at the other interior end 108. A large metal disk-shaped flange 107 is attached to the open end 106 of pipe 102 and is located on the exterior of padding 104. The diameter of metal pipe 102 is slightly larger than the diameter of launch barrel 90 so that retrieving dummy 100 can be placed over launch barrel 90. On the detonation of a blank cartridge in firing chamber 80, gases are explosively expelled from the exit 95 of launch barrel 90 and expand into pipe 102 causing the launch of retrieving dummy 100.

FIG. 9 shows a hollow protective plastic tube 110 of the present invention which is open at both ends. Protective plastic tube 110 is clipped to launch support 40 and fits over retrieving dummy 100 and bird retaining basket 130. Protective plastic tube 110 is designed to protect both retrieving dummies 100 and bird retaining baskets 130 from being inappropriately retrieved or chewed by inexperienced dogs. Once protective plastic tube 110 has been properly installed, the launch of retrieving dummy 100 or bird retaining basket 130 can take place in the normal fashion as described above, unaffected by the protective plastic tube 110.

FIG. 5 shows remote artificial human figure 120, sometimes referred to as a remote gunner, comprising a two-sided, two-dimensional human image 121 having front and back broad sides 126 and thin edge 127. Human image 121 is attached to and controlled by a rotary servomotor 124 which is in turn mounted on a tripod support 122. The servomotor 124 is connected by wire to one receiver unit 170 and responds to commands sent to the receiver unit by remote control unit 150. One remote gunner 120 is installed at each of up to four possible locations. Human image 121 can be rotated 360 degrees by servomotor 124 to cause either broad sides 126 or thin edge 127 to face the dog being trained. When oriented with broad sides 126 facing the dog, human image 121 is readily visible to the dog, but when oriented with thin edge 127 facing the dog, human image 121 becomes essentially invisible to the dog. The artificial human figure 120 therefore provides a unique training assist for the dog by allowing the dog to see, for a brief period, what appears to be a human assistant. The manipulation of remote gunner 120 helps the dog locate a launched retrieving dummy or bird and simulates events which occur during an actual field trial.

FIG. 6 shows a bird retaining basket 130 used in the present invention to launch birds from the same launch devices 10 used to launch training dummies 100. Bird basket 130 comprises a metal pipe 131 and flange 139 similar to metal pipe 102 and flange 107 of retrieving dummy 100. The interior diameter of metal pipe 131 is slightly larger than the diameter of launch barrel 90 so that metal pipe 131 can be placed over launch barrel 90. Gases explosively expelled from the exit 95 of bore 92 expand into pipe 131 causing the launch of bird retaining basket 130. Mounted on the top of pipe 131 is a retaining block 134 containing a hinged rod frame 132 connected to rods 135 inserted through retaining block 134 and held open by springs 136 connected to the ends of rods 135. Rod frame 132 supports a mesh net 133 that holds a bird in the vertical upright position. Rod frame 132 is held closed against the force of springs 136 by Velcro® retaining straps 137. On launch, the force created by the explosively expanding gas forces metal pipe 131 and retaining block 134 upward causing Velcro® straps 137 to release. Springs 136 pull rod frame 132 outward to its fully open position. A retaining line 138 is attached to flange 139 of pipe 131 and suitably pegged to the ground or fixed to an immovable object. After a flight of about eight to ten feet, bird retaining basket 130 is halted by retaining line 138 but the momentum of the bird, which is no longer secured within mesh net 133, causes it to continue to rise along a normal launch trajectory.

Figure 11:
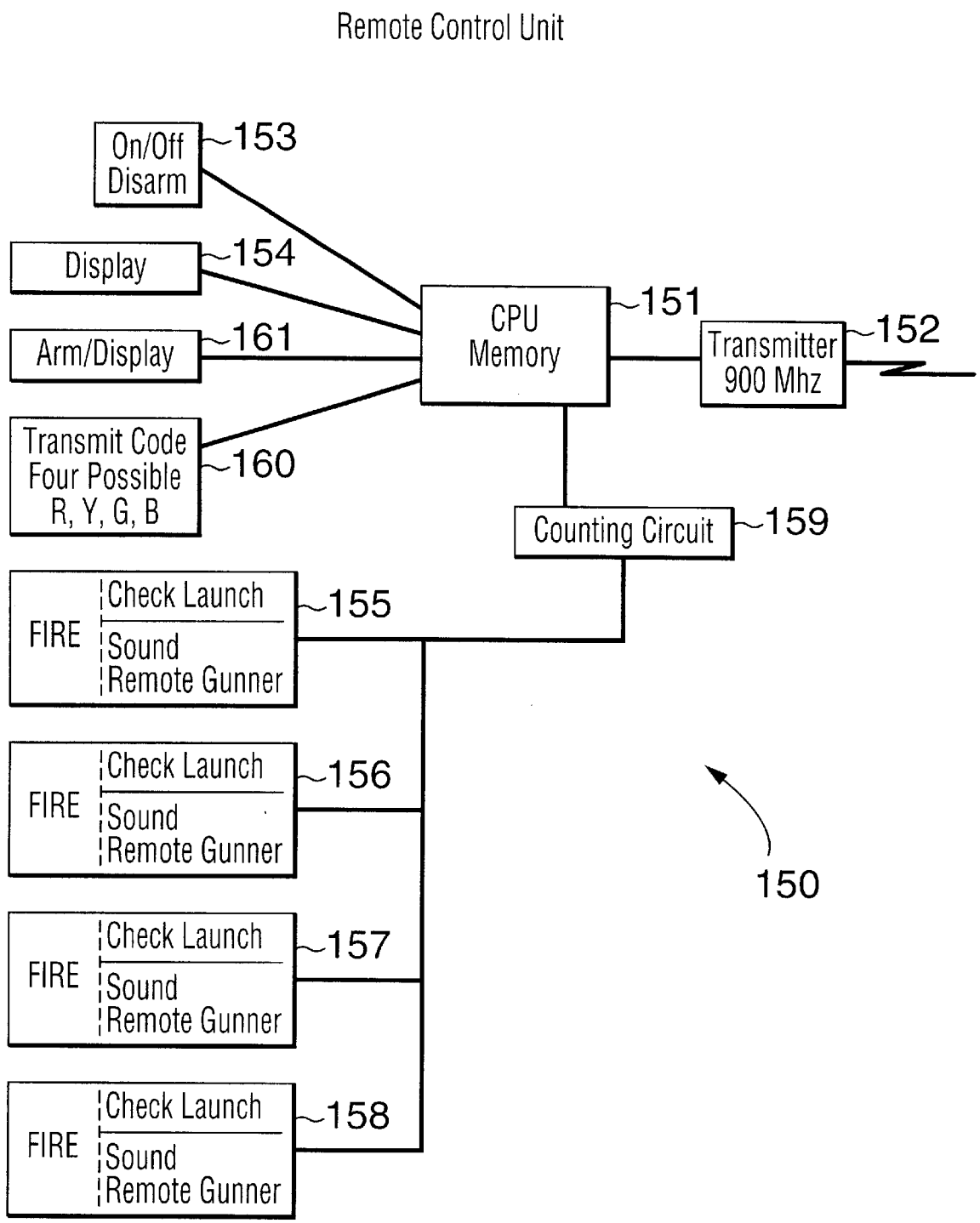
FIG. 11 is a schematic diagram of the remote control unit of FIG. 7.

FIG. 7 shows one embodiment of the electronic remote control unit 150 of the present invention. Remote control unit 150 is a compact hand held unit that fits in the palm of the hand. FIG. 11 is a schematic diagram of remote control unit 150. Remote control unit 150 comprises a central processing unit (CPU) and memory 151 and a radio transmitter 152 operating at 900 Mhz. Remote control unit 150 has an on/off power switch 153 (not shown in FIG. 7), a three-digit, seven segment LED display 154 and four, two-position switches 155, 156, 157 and 158. On the base of remote control unit 150 is a four-position transmit code selector 160. Four distinct transmit codes, identified by four colours; red, yellow, blue and green are possible in order to separate or combine similar systems operating within the range of transmitter 152. Remote control unit 150 has a two-position arming switch 161 (not shown in FIG. 7) that sends either an arm or disarm signal to receiver unit 170. A counting circuit 159 keeps track of the number of launches that have taken place from each location and the number of remaining launches. Remote control unit 150 operates on rechargeable NiCd batteries and has a range of about of about 400 yards.

LED display 154 of remote control unit 150 is used to display the number of launches that have occurred from a particular location, the battery condition of the remote control unit 150, an armed warning flash to show that the receiver units 170 are armed and the location position number of the switch being activated.

Figure 2:
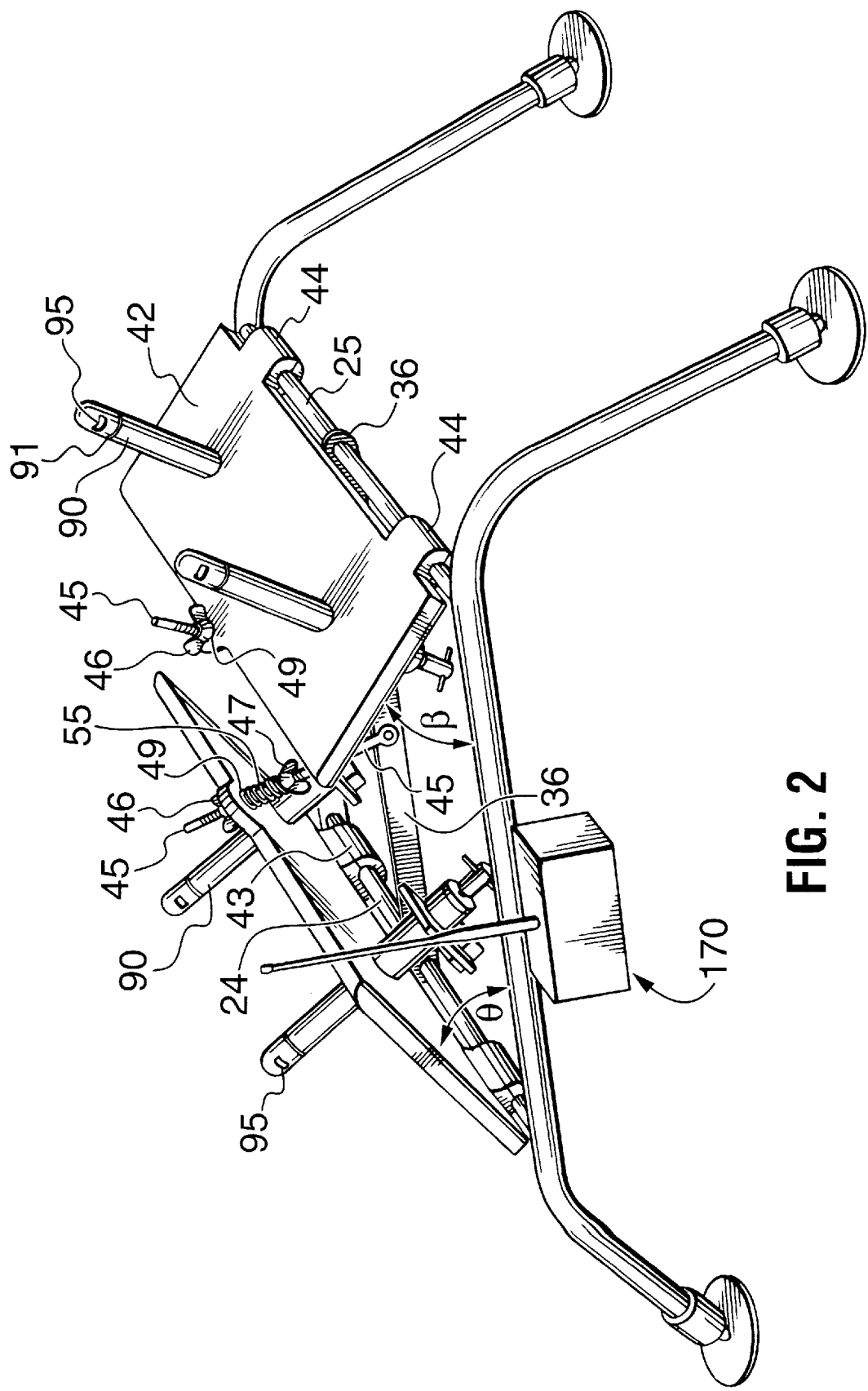
FIG. 2 is a perspective view of the embodiment of the FIG. 1, with the adjustable hinged support plates in a raised position.
Figure 8:
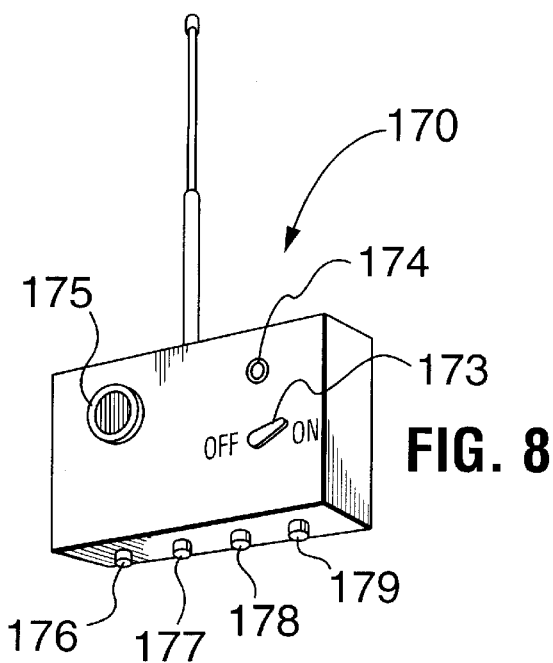
FIG. 8 is a perspective view of one embodiment of an electronic receiver unit of the present invention.
Figure 10:
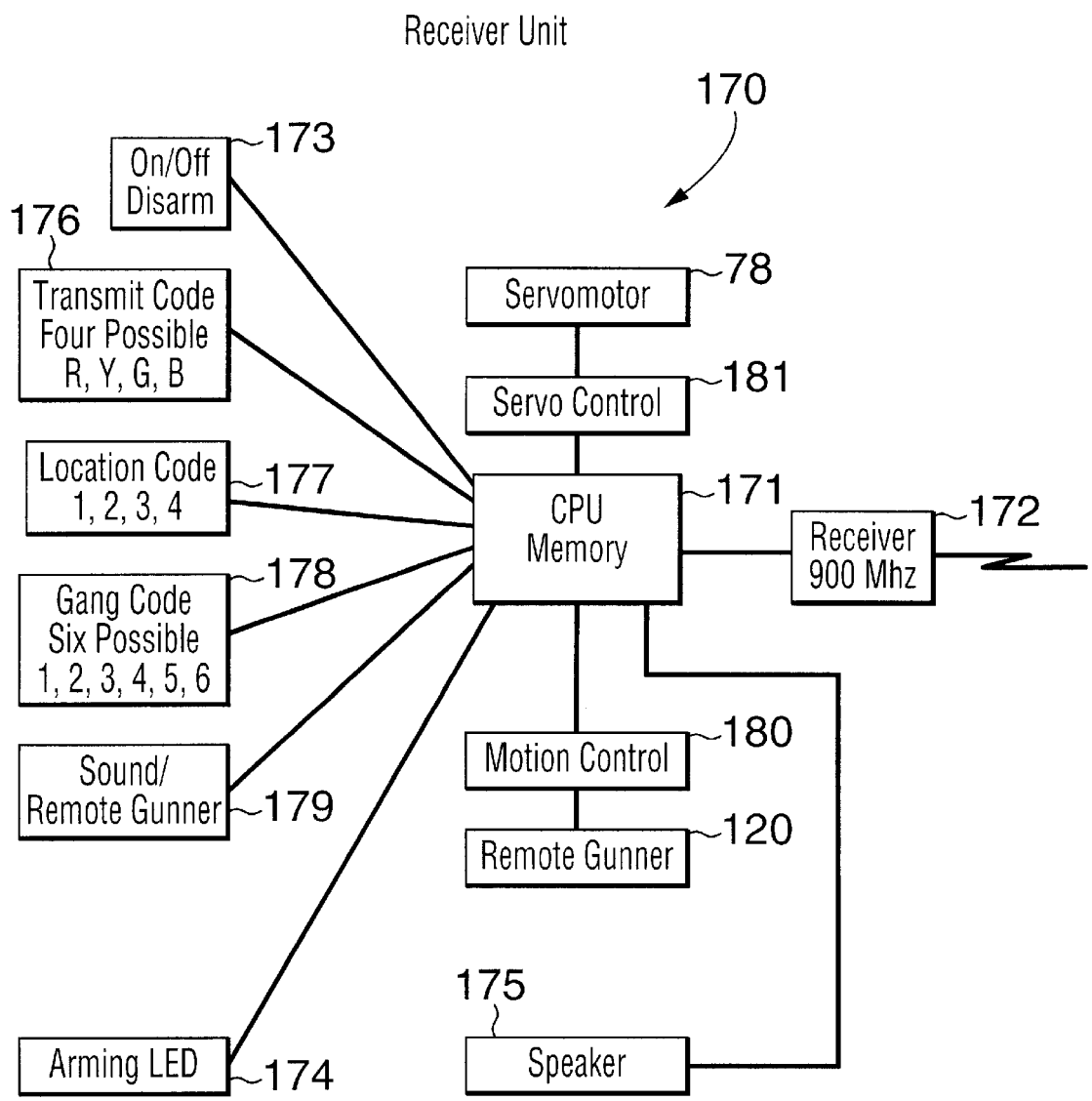
FIG. 10 is a schematic diagram of the electronic receiver unit of FIG. 8.

FIGS. 1 and 2 shows an electronic receiver unit 170 of the present invention attached to base frame 20 of launch device 10 and connected by a wire to trigger servomotor 78 (see FIG. 3). FIG. 8 is a more detailed view of receiver unit 170 and FIG. 10 is a schematic diagram of receiver unit 170. Receiver unit 170 comprises a CPU and memory 171 and a radio receiver 172 operating at 900 Mhz. Electronic receiver unit 170 has an on/off power switch 173, a red LED armed indicator light 174, a speaker 175, a four position transmit code selector 176, a four position location code selector 177, a six position gang code selector 178 and a multi-position selector 179 for selecting between sound and remote gunner control. A number of possible sounds are possible including duck, pheasant, human voice or siren. The sound volume for the bird and human voice is set at 90 db and the siren volume is set at 120 db. A sound circuit in CPU 171 provides the modulation to create the desired bird sounds. Connected to CPU 171 is a motion control logic circuit 180 for controlling remote gunner 120 by turning the human image 121 so that it becomes either visible or invisible to the dog as described above. Servomotor control circuit 181 is also provided to control trigger servomotor 78 of trigger mechanism 70. Receiver unit 170 is powered by rechargeable NiCd batteries.

The on/off power switch 173 on receiver unit 170 is used to turn the power on and off and disarm receiver unit 170. When on/off power switch 173 is in the "off" position the power is off, receiver unit 170 is disarmed and launch mechanisms 50 are safe for loading. When on/off switch 173 is in the "on" position, the receiver unit 170 is activated but remains unarmed until an arming signal is received from remote control unit 150. The launch mechanisms 50 can only be fired following the receipt by receiver unit 170 of a reset signal and an arming code generated by activating the arming switch 161 on the remote control unit 150. The red LED armed indicator light 174 will flash once per second to indicate that the receiver unit 170 has been armed.

Moving the on/off power switch 153 on remote control unit 150 to the "on" position turns on the power to the remote control unit 150 and sends out a disarm code to all receiver units 170. Receiver units 170 can only be armed by pressing the arm/disarm switch 161. As a safety precaution, a second arming code is sent along with each fire code. Receiver units 170 will not send a launch signal to trigger servomotors 78 until this second arming code has been received. This prevents accidental activation of the launch mechanisms by extraneous radio signals. Receiver units 170 can be disarmed at any time by pressing the arm/disarm switch 161 on remote control unit 150.

The present invention has the capability of launching up to 96 retrieving dummies or birds from up to four different locations, that is, up to six launch devices 10 connected or ganged together at each location. Launches at each location are controlled sequentially by a single one of the four switches 155, 156, 157 or 158 on remote control unit 150, each switch corresponding to a single location code (1, 2, 3 or 4) on the four-position location code selector 177 on receiver unit 170.

At each location, location code selector 177 on each electronic receiver unit 170 is set to the same position; one, two, three or four. Each gang code selector 178 on each receiver unit 170 is set to a different position; one, two, three, four, five or six depending on the desired firing sequence of the attached launch device 10. At each location, up to six multiple launch devices 10 are controlled by one of the four switches 155, 156, 157 and 158 on remote control unit 150. For example, switch 155 controls all electronic receiver units 170 having location code selectors 177 set to position one and switch 156 controls all electronic receiver units 170 having location code selectors 177 set to position two and so on.

Transmit code selector 160 on remote control unit 150 and transmit code selector 176 on all receiver units 170 are dialled to the same setting; red, green, yellow or blue. The transmit code isolates radio transmitters and receivers operating in the same geographic location to prevent interference and permit group training by multiple dog owners.

The operation of the present invention will now be described with respect to location number one and it will be understood that similar procedures apply to the remaining three possible locations. Pressing switch 155 on remote control unit 150 to the right for less than one second sends a request to counting circuit 159 causing LED 154 to display the location number and the number of launches (1 to 24) that have already taken place from location one. Pressing switch 155 to the right for more than one second causes transmitter 152 to send a signal to receiver 172 to activate sound circuit 175 or remote gunner control circuit 181, depending on the position of multi-position selector 179, at location one. If some multi-position selectors 179 at location one are set to control remote gunner 120 and other multi-position selectors 179 are set to provide sound, pressing switch 155 to the right for more than one second will rotate the remote gunner 120 and cause a sound to be issued at location one. Pressing switch 155 to the left for over one second causes transmitter 152 to send an arming signal and a fire code to all electronic receiver units 170 at location one. The fire code includes a location code, in this case one, and a gang code to identify the particular launch device 10 that should be fired. The first four fire codes generated by pressing switch 155 to the left for more than one second include a gang code of one and results in the sequential launch of all four retrieving dummies or birds from launch device 10 at location one having its gang code selector 178 set to position one. Launch mechanisms 50 on launch device 10 are activated in a predetermined order commencing with one side of the split launch support 40 and alternating from side to side until all four retrieving dummies or birds are launched. At this point, counting circuit 159 increments the gang code by one so that the next fire code sent by remote control unit 150 will activate the launch device 10 at location one that has its gang code selector 178 set to position two. In this way, up to 24 training dummies or birds at location one can be sequentially launched using switch 155 on remote control unit 150. Launch mechanisms 10 at the other three possible locations are controlled in the same way by corresponding switches 156, 157 and 158 on remote control unit 150. By using the four different switches 155, 156, 157 and 158 on remote control unit 150 and by setting location code selectors 177 on receiver units 170 to correspond, an operator can selectively launch from four different locations.

Trigger mechanisms 70 on launch mechanisms 50 are activated by pressing one of the switches 155, 156, 157 and 158 on remote control unit 150 to the right for more than one second. This causes transmitter 152 to send a fire code to all receivers 172 at the corresponding location and increments the counting circuit 159 for that location by one. The fire code sent out consists of an arming code, a transmit code (red, yellow, green or blue), a location code (1, 2, 3 or 4), a gang code (1, 2, 3, 4, 5, 6) and a frequency code. Once a receiver unit 170 receives a properly sequenced fire code corresponding to its location code selector 177 and gang code selector 178, servomotor control circuit 181 activates trigger servomotor 78 on one of the launch mechanisms 50. As noted above, the sequence of launch for each launch device 10 is predetermined and alternates from one side of the launch support 40 to the other until all four launch mechanisms 50 have been activated.

Referring to FIG. 3, once activated, trigger servomotor 78 rotates counter clockwise causing arm 75 to rotate in the direction of arrow A, retracting head 72 of trigger pin 74 from keyway 63, thus releasing firing pin shaft 66 and causing firing pin 61 to travel forward under the force of spring 64 and impact the back of a blank rifle cartridge placed in the top portion of firing chamber 80 resulting in the explosive release of gas from the exit 95 of bore 92 of launch barrel 90 and the launch of a retrieving dummy or bird placed over barrel 90 as previously described above.

The amount of force generated at launch and therefore the distance travelled by the retrieving dummy or bird is controlled in two ways by the present invention. First, a selection of blank cartridges having a range of explosive strengths from 1 to 8 is available to generate a range of different launch forces. Second, a series of plastic spacers of varying length (not shown) can be placed over launch barrel 90 to prevent retrieving dummy 100 or bird retaining basket 130 from fitting completely down over launch barrel 90. This results in a larger space between the top of launch barrel 90 and the closed end of pipe 102 of retrieving dummy 100 or pipe 131 of bird retaining basket 130. The larger space results in decreased launch force generated on detonation of a blank cartridge. These spacers are a preferred feature of the present invention since even the lowest strength blank rifle cartridge can sometimes cause a more powerful launch than desired.

To operate the present invention for competitive field training, up to four launch devices 10 and artificial human figures 120 are carried into the field at one time by a single trainer. Launch devices 10 and artificial human figures 120 can be set up at one location or at up to four different locations and can be connected in a series of up to six launch devices per location for a total of 24 launchers in four different locations. The angle and direction of each launch device 10 is adjusted by adjusting telescopically adjustable legs 31 or by varying the angles θ and β of launch supports 41 and 42 respectively. Each launch mechanism is loaded by placing a rifle cartridge in top portion 81 of firing chamber 80 and trigger mechanism 70 is cocked by pulling down on handle 65. Launch supports 41 and 42 are closed and retrieving dummies 100 or bird retaining baskets 130 are placed over all launch barrels 90. The receiver units 170 of each launch device 10 are programmed by appropriately setting the transmit code selector 176, the location code selector 177 and the gang code selector 178 to correspond to the desired transmit code, location and launch sequence. Multi-position selector 179 is dialled to select a desired sound or remote gunner control and the power to the receiver unit is turned on.

The trainer then retreats to a remote starting point with the remote control unit 150 and the dog or dogs to be trained. The remote control unit 150 is turned on and the arming switch 161 is activated to reset and arm the receiver units 170. The trainer can then proceed to selectively launch birds or retrieving dummies from launch devices 10. On launch, the gun shot sound created by the detonation of blank cartridge simulates the gun shot of a hunter firing at a target and alerts the dog to be ready for retrieval. The trainer may also provide the dog with visual or audible assistance using the remote gunner 120 or the various selectable sounds.

The various above-described sound generating features, remote gunner control and the ability of the present invention to launch multiple training dummies or birds from multiple locations and in multiple directions, provide the trainer with all the tools necessary to replace field assistants that would normally be hired for competitive field training of retrieving or other hunting dogs.

With reference now to FIGS. 12, 13, 14, 15 and 16 an alternative embodiment of the present invention will be described which provides an alternative method for controlling launch devices 10, remote gunners 120 and for generating and controlling sound.

Figure 12:
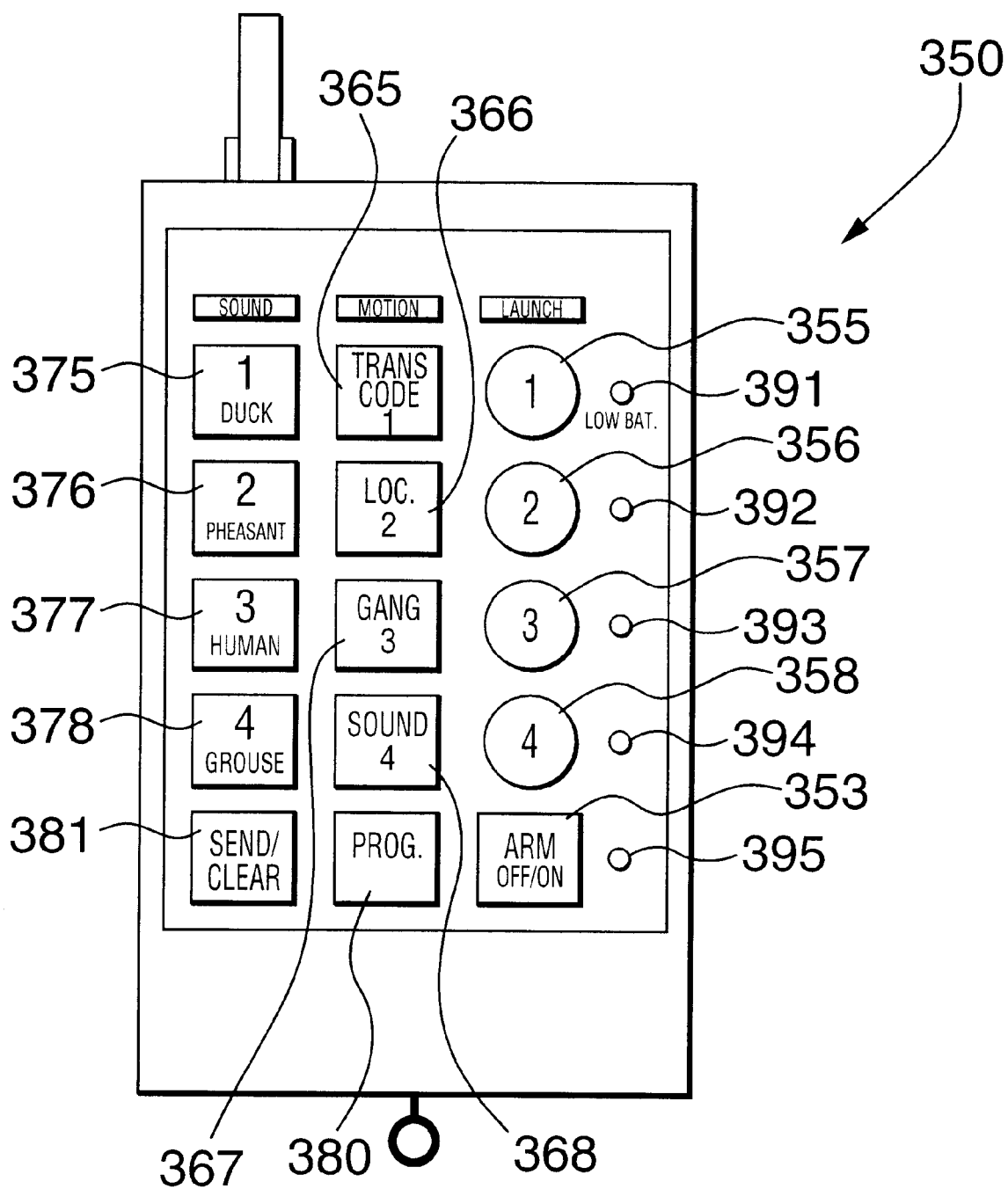
FIG. 12 is a top plan view of an alternative embodiment of an electronic remote control unit of the present invention.
Figure 13:
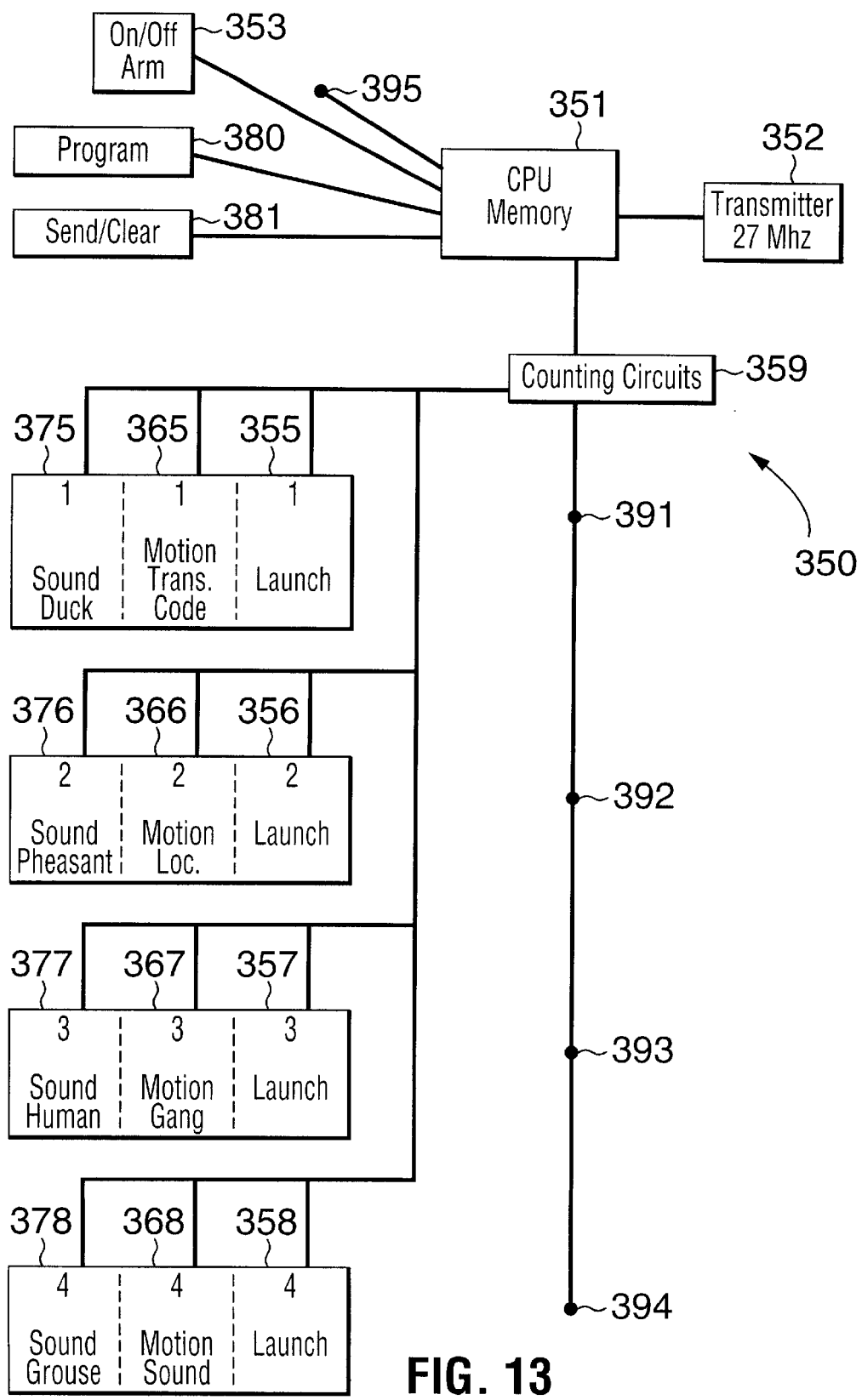
FIG. 13 is a schematic diagram of the electronic remote control unit of FIG. 12.

FIG. 12 shows a modified electronic remote control unit 350 for use with the present invention and FIG. 13 is a schematic diagram of remote control unit 350. Remote control unit 350 is a compact hand held unit that fits in the palm of the hand. Remote control unit 350 comprises a central processing unit (CPU) and memory 351, a radio transmitter 352 operating at 27 Mhz and a series of plastic covered membrane switches as further described below. It will be understood by those skilled in the art that the operating radio frequency of the present invention is not critical and that any frequency which provides a low level of interference with surrounding radio frequency sources will be satisfactory.

The above-noted membrane switches on remote control unit 350 includes an on/off power and arming switch 353, a program switch 380 and a send/clear switch 381. Additional membrane switches on remote control unit 350 include launch switches 355, 356, 357 and 358, motion switches 365 (transmit code), 366 (location code), 367 (gang code) and 368 (sound), and sound switches 375 (duck), 376 (pheasant), 377 (human), and 378 (grouse), each corresponding to a specific numbered location (1 to 4). As noted above and as shown in FIG. 12, each of the motion switches and the sound switches perform a dual function depending on whether or not the program switch 381 has been previously depressed in sequence. This dual function will be described further below. Next to the launch switches 355, 356, 357 and 358 are position LEDs 391, 392, 393 and 394 and next to the on/off power and arming switch 353 is an arming indicator LED 395. A counting circuit 359 is included to count the number of launches from each location. Remote control unit 350 is powered by a rechargeable power supply. Position LED 391 also functions as a low battery warning light.

Figure 14:
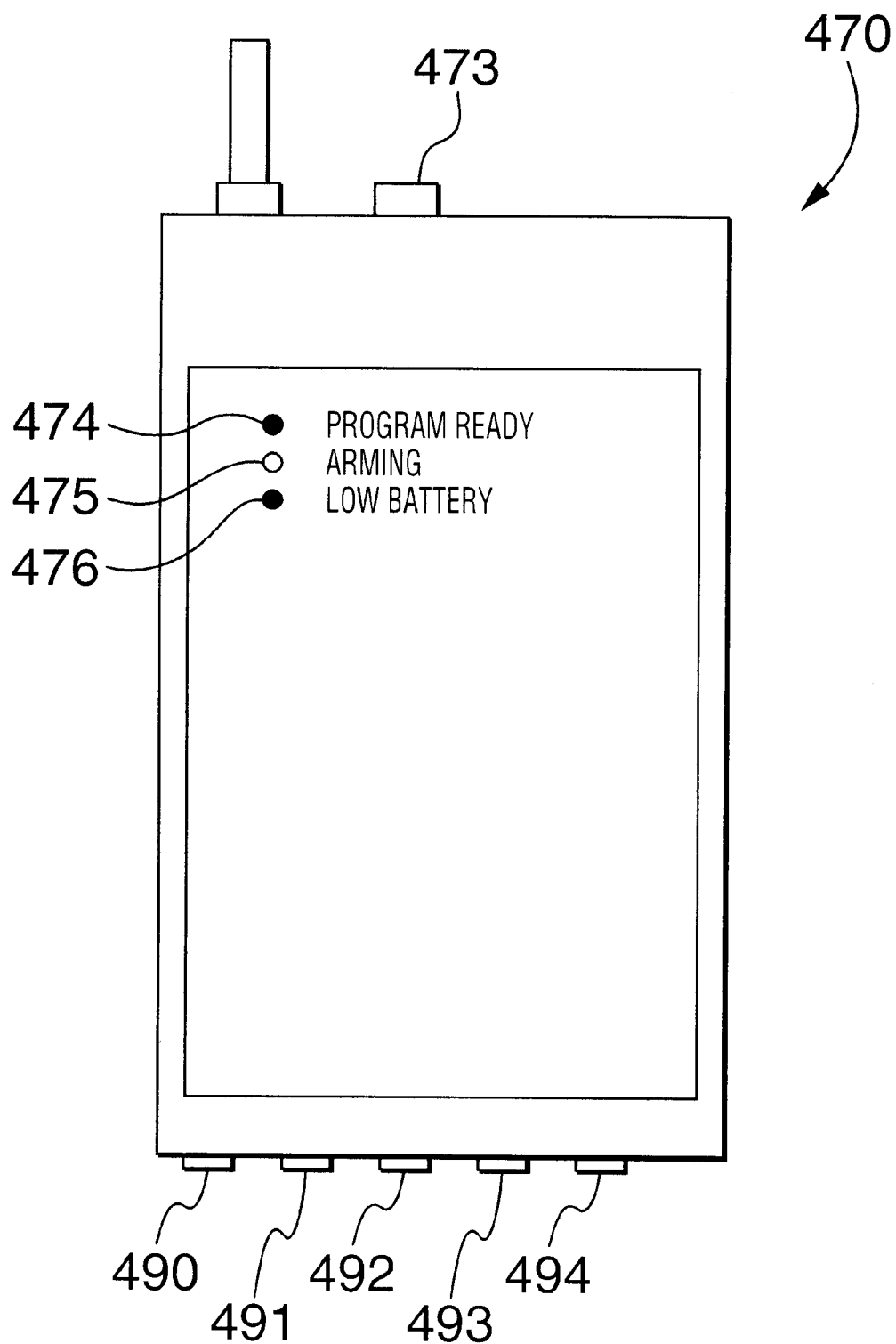
FIG. 14 is a plan view of an alternative embodiment of an electronic receiver unit of the present invention.
Figure 15:
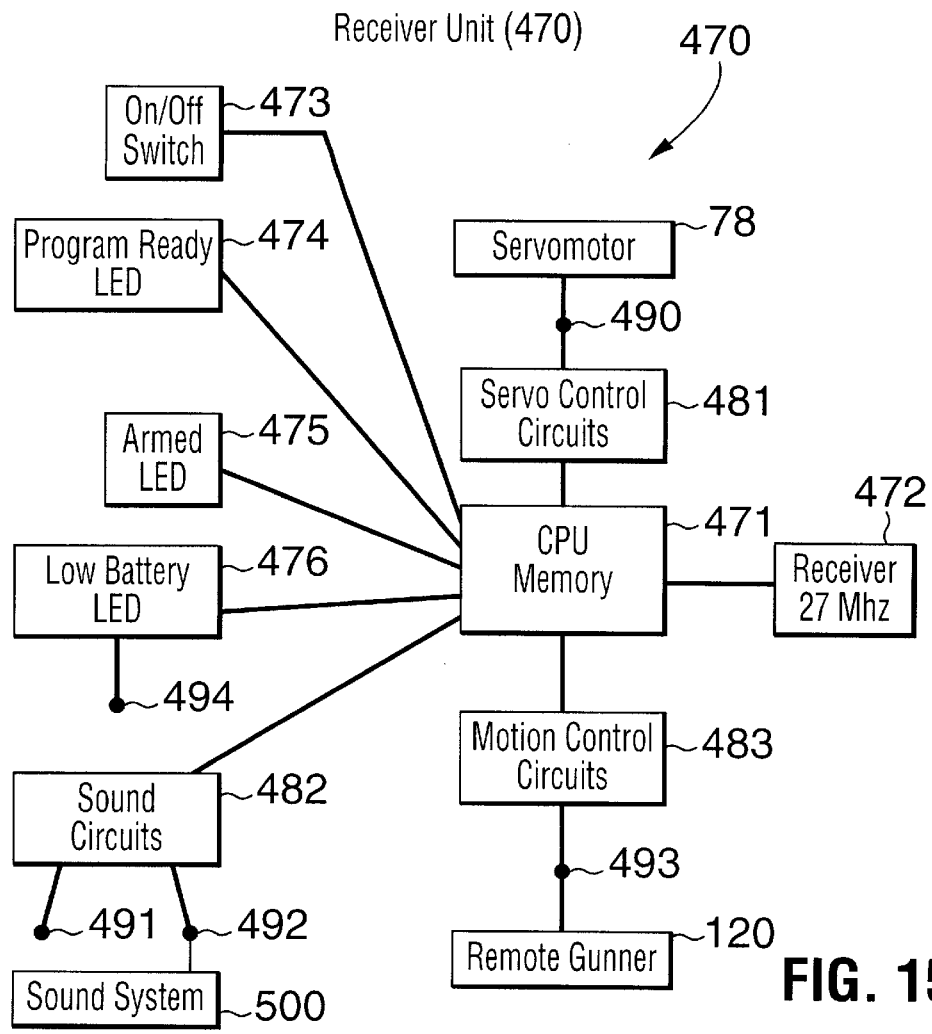
FIG. 15 is a schematic diagram of the electronic receiver unit of FIG. 14.

FIG. 14 shows a modified electronic receiver unit 470 for attachment to base frame 20 of launch device 10 and FIG. 15 is a schematic diagram of receiver unit 470. Receiver unit 470 comprises a CPU and memory 471 and a radio receiver 472 operating at the same 27 Mhz frequency as the radio transmitter 352 of remote control unit 350. Electronic receiver unit 470 has an on/off power switch 473, a program ready LED 474, an armed indicator LED 475 and a low battery indicator LED 476. Along the bottom of receiver unit 470 is located a trigger servomotor connecting jack 490, a grouse piezo speaker connecting jack 491, a sound connecting jack 492, a remote gunner connecting jack 493 and charging jack 494 for charging the internal rechargeable power source. Receiver unit 470 further comprises trigger servomotor control circuits 481 for controlling trigger servomotor 78, motion control circuits 483 for controlling remote gunner 120 and sound circuits 482 for controlling sound system 490 shown in FIG. 14 and a piezo speaker for generating grouse sounds (not shown). The piezo speaker for generating grouse sounds is external from the receiver unit 470, but is normally quite small in size and is attachable directly to receiver unit 470.

Figure 16:
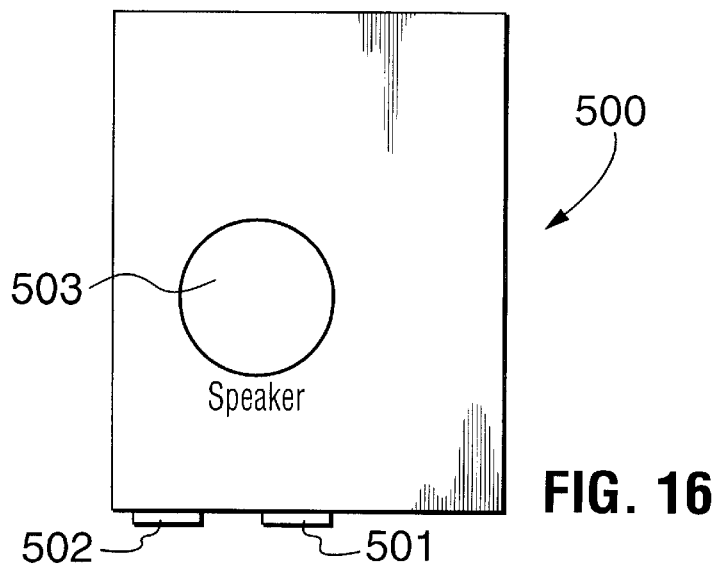
FIG. 16 is a side elevation view of a sound system of one embodiment of the present invention.

FIG. 16 shows a separate sound system 490 for connection to receiver unit 470 by receiver connecting jack 491. Sound system 490 includes a charging jack 492 for charging the internal rechargeable power source and a speaker 493. Generally only one sound system 490 is used per location and is connected to receiver unit 470 at gang position one.

For safety and to conserve battery life, all receiver units 470, remote control units 350 and sound systems 490 automatically turn off after eight hours of non-use.

This alternative embodiment of the present invention is capable of using four different transmit codes or channels to enable several trainers to operate in the same geographic location without interfering with one another. The remote control unit 350 is also capable of controlling up to four launch devices 10 connected together at each of up to four different locations. Additional launch devices 10 could be added at each location by adding additional keys to remote control unit 350 or by reprogramming CPU 351 to recognize a different sequence of key strokes.

After loading and adjusting the angle of all launch mechanisms 10, remote control unit 350 is used to program each receiver unit 470 with a particular transmit code (1 to 4), location code (1 to 4), gang code sequence (1 to 4) and sound (duck, pheasant, human or grouse). The steps involved in programming receiver unit 470 will now be illustrated for a transmit code one, a duck sound and a launch device 10 connected at location one and gang position one. First, the on/off switch 473 on receiver unit 470 is depressed until the program ready light 474 is activated. Transmit code (channel) one is set by first pressing program switch 380 on remote control unit 350, followed by pressing the first motion switch 365 (transmit code) and then the first sound switch 375 (transmit code one). Location code one is set by first pressing program switch 380, followed by pressing the second motion switch 366 (location) and then the first sound switch 375 (location one). Gang (launch sequence) one is set by first pressing program switch 380, followed by pressing the third motion switch 367 (gang) and the first sound switch 375 (gang one). Duck sound is selected by first pressing program switch 380, followed by pressing the fourth sound switch 368 (sound) and then the first sound switch 375 (duck). Once all options have been entered into remote control unit 350, the program is transferred to the receiver unit 470 by pressing the send/clear switch 381. Once the program has been received and verified by the receiver unit 470, the armed ready light 475 will activate. The above steps are repeated with necessary variation to program all receiver units 470 connected to all launch devices 10 connected at each location.

For convenience, remote control unit 350 stores the last program sequence entered. Therefore, following the steps described above, to program the receiver unit 470 connected to the second launch device 10 connected at location one, it would only be necessary to enter a different gang code. This is done by pressing program switch 480, followed by pressing the third motion switch 367 (gang) and then the second sound switch 376 (gang two). The new program is then transferred to receiver unit 470 attached to the second launch device 10 at location one.

The LEDs 391, 392, 393 and 394 are used to indicate the last location code entered. Pressing program switch 480 followed by pressing the second motion switch 366 (location) will cause one of the LEDs 391, 392, 393 or 394 to activate, indicating the last location code in memory, one, two, three or four respectively.

Receiver unit 470 can be disarmed or armed by pressing the on/off switch 473 for less than one second. Arming or disarming receiver unit 470 in this manner has priority over arming or disarming using remote control unit 350. Holding down the on/off switch 473 for two seconds or more will turn the receiver unit 470 off and cancel all programming.

Once all launch devices 10 have been loaded and programmed, the trainer moves to a remote location with the remote control unit 350. Pressing the on/off arming switch 353 for less than one second will arm or disarm the remote control unit 350 as indicated by arming indicator LED 395. Pressing on/off arming switch 353 for more that one second will turn the remote control unit 350 on or off and cause it to reset. Pressing the send/clear switch 381 or the program switch 380 will immediately cause all receiver units 470 to disarm. The number of launches from each location is not displayed by remote control unit 350 in this alternative embodiment of the present invention but the option could easily be added by means of repeated flashes of the corresponding LEDs 391, 392, 393 or 394, or by means of incorporating a display into remote control unit 350.

It may sometimes be desirable to re-load launch devices 10 at a particular location, even though all launch mechanisms 50 have not yet been fired. This is accomplished by resetting the counting circuits 359 of remote control unit 350. The send/clear switch 381 is pressed, followed by pressing the second motion switch 366 (location) and then the launch switch 355, 356, 357 or 358 corresponding to the location being reset. This resets the counting circuit 359 for that location and permits reloading of all launch devices at that location. Subsequent fire codes sent to that location will commence with the first launch mechanism 50 on launch device 10 at gang position one.

A retrieving dummy or bird is launched from any given location (1 to 4) by pressing the corresponding launch switch 355 (location one), 356 (location two), 357 (location three) or 358 (location four) for more than one second. This causes transmitter 352 to send a fire code to all receivers 472 at the corresponding location and increments the counting circuit 359 for that location by one. The fire code sent includes an arming code, a transmit code (channel 1, 2, 3 or 4), a location code (1, 2, 3 or 4), a gang code (1, 2, 3 or 4) and a frequency code. Once a receiver unit 470 receives a properly sequenced fire code corresponding to its set program, trigger servomotor control circuit 481 activates trigger servomotor 78 on one of the launch mechanisms 50. As noted above, the sequence of launches for each launch device 10 is predetermined and alternates from one side of the launch support 40 to the other until all four launch mechanisms 50 have been activated. Once all four launch mechanisms 50 at gang position one have been fired, counting circuit 359 advances the gang code from one to two. The next fire code generated by pressing the launch switch corresponding to that location will contain a gang code of two, thus activating the first launch mechanism 50 on launch device 10 at gang position two. This sequence of events is repeated for each launch device 10 at each of locations 1, 2, 3 and 4. The above-describe embodiment of the present invention therefore has the capability of launching up to 16 retrieving dummies or birds from each of up to four locations for a total of up to 64 launches.

Sound is generated from a particular location by pressing the corresponding sound switch 375 (location one), 376 (location two) 377 (location three) or 378 (location four). This causes transmitter 352 to send a signal to receiver 472, activating sound circuit 482, causing sound system 490 or grouse piezo speaker (not shown) to issue the desired sound.

The human figure 121 of remote gunner 120 at a particular location is rotated by pressing the corresponding motion switch 365 (location one), 366 (location two) 367 (location three) or 368 (location four). This causes transmitter 352 to send a signal to receiver 472, activating motion circuits 483 causing servomotor 124 to rotate human figure 121. Generally only one remote gunner 120 is used per location and is connected to receiver unit 470 at gang position one.

The above-described embodiments of the present invention are meant to be illustrative of a preferred embodiment of the present invention and are not intended to limit the scope of the present invention. Various modifications, which would be readily apparent to one skilled in the art of retriever dog training, are intended to be within the scope of the present invention without any departure from the spirit of the invention. The appended claims, properly construed, form the only limitation to the scope of the present invention.

I claim:

1. A remote controlled launcher for training retrieving and hunting dogs using launch mechanisms of the type formed with a firing chamber, firing pin means, trigger means for actuating the firing pin means for firing a blank cartridge placed in the firing chamber and a launch barrel designed for explosive release of gas from a blank cartridge for launching a retrieving dummy or bird mounted on the launch barrel comprising:

a ground engaging frame means;

a plurality of support means connected to said frame means, said support means supporting a plurality of said launch mechanisms with said launch barrels directed away from said frame means, said support means being individually pivotable with respect to said frame means for directing said plurality of said launch mechanisms in a plurality of directions and angles;

a plurality of trigger control means mounted to said frame means for controlling and releasing said trigger means, comprising trigger servomotor means and arm means coupled to said trigger servomotor means for engaging said trigger means;

whereby retrieving dummies or birds mounted on said launch barrels may be sequentially explosively launched in a plurality of directions by signals transmitted from a remote location by controlling current to said trigger servomotor means in response to said transmitted signals.

2. A remote controlled launcher according to claim 1, further comprising a radio receiver means for receiving said transmitted signals and for controlling current to said trigger servomotor means.

3. A remote controlled launcher according to claim 2, wherein said radio receiver unit comprises:

programable central processing means;

radio receiving circuit means connected to said central processing means for receiving said transmitted signals; and trigger servomotor control circuit means connected to said central processing means, for sequentially controlling current to said plurality of said trigger servomotor means in response to said transmitted signals.

4. A remote controlled launcher according to claim 3, further comprising sound generating means connected to said radio receiver unit, said sound generating means responsive to signals transmitted from a remote location.

5. A remote controlled launcher according to claim 4, wherein said sound generating means comprises sound control circuit means connected to said central processing means and speaker means connected to said sound control circuit means.

6. A remote controlled launcher according to claim 3, further comprising a remote controlled figure connected to said radio receiver unit, said figure controllable by signals transmitted from a remote location.

7. A remote controlled launcher according to claim 6, wherein said figure comprises:

a support means;

a two-dimensional image rotatably mounted on said support means; and an image servomotor mounted on said support means, said image servomotor connected to said image for rotating said image in response to said transmitted signals.

8. A remote controlled launcher according to claim 7, wherein said radio receiver unit further comprises: motion control circuit means connected to said central processing means, for sequentially controlling current to said image servomotor means in response to said transmitted signals.

9. A remote controlled launcher according to claim 3, further comprising an electronic remote control unit comprising:

a programmable central processing means;

a radio transmitting means connected to said central processing means for generating said transmitted signals; and a switch means connected to said central processing means for sequentially controlling the generation of said transmitted signals thereby enabling the sequential activation of said plurality of said launch mechanisms from a remote location.

10. A remote controlled launcher according to claim 9, wherein said central processing means of said radio receiver unit is programmable by said transmitted signals generated by said remote control unit.

11. A system of a plurality of said remote controlled launchers each as set forth in claim 3, wherein there is also provided an electronic remote control unit comprising:
   a programmable central processing means;
   a radio transmitting means connected to said central processing means for generating said transmitted signals;
   a counting circuit means connected to said central processing means for counting the number of launches from each of said plurality of said launchers; and
   a plurality of switch means connected to said central processing means for programming said central processing means and for sequentially and selectively controlling the generation of said transmitted signals thereby enabling the selective activation of said plurality of said remote controlled launcher and the sequential activation of said plurality of said launch mechanisms, all from a remote location.

12. A method of training retrieving and hunting dogs comprising the steps of:
   positioning, in a remote location, a system of a plurality of said remote controlled launchers as set forth in claim 3;
   mounting retrieving dummies or birds on said launch barrels; and
   transmitting signals from a remote location to selectively activate said plurality of said launchers and to sequentially control current to said trigger servomotor means to thereby sequentially and selectively explosively launch said retrieving dummies or birds,
   wherein said signals are selectively and sequentially transmitted from said remote location using an electronic remote control unit comprising:
      a programmable central processing means;
      a radio transmitting means connected to said central processing means for generating said transmitted signals;
      a counting circuit means connected to said central processing means for counting the number of launches from each of said plurality of said launchers; and
      a plurality of switch means connected to said central processing means for activating said radio transmitting means.

13. A method of training retrieving and hunting dogs according to claim 12, further comprising the step of programming said central processing means of said radio receiver unit using said transmitted signals generated by said remote control unit.

14. A remote controlled launcher according to claim 1, wherein said each support means is comprised of one or more plates, each plate being individually hingably connected to said frame mans, each plate supporting one or more launch mechanism.

15. A remote controlled launcher according to claim 14, wherein the angular position of each of said plates with respect to said frame is individually adjustable by means of a support bolt threadably connected to each of said plates and pivotably connected to said frame.

16. A method of training retrieving and hunting dogs comprising the steps of:
   positioning, in a remote location, a remote controlled launcher using launch mechanisms of the type formed with a firing chamber, firing pin means, trigger means for actuating the firing pin means for firing a blank cartridge placed in the firing chamber and a launch barrel designed for explosive release of gas from a blank cartridge for launching a retrieving dummy or bird mounted on the launch barrel comprising:
      a ground engaging frame means;
      a plurality of support means connected to said frame means, said support means supporting a plurality of said launch mechanisms with said launch barrels directed away from said frame means, said support means being individually pivotable with respect to said frame means for directing said plurality of said launch mechanisms in a plurality of directions and angles, and
      a plurality of trigger control means mounted to said frame means for controlling and releasing said trigger means, comprising trigger servomotor means and arm means coupled to said trigger servomotor means for engaging said trigger means;
   mounting retrieving dummies or birds on said launch barrels; and
   transmitting signals from a remote location to sequentially control current to said trigger servomotor means to thereby sequentially explosively launch said retrieving dummies or birds.

17. A method of training retrieving and hunting dogs according to claim 16, wherein said remote controlled launcher further comprises a radio receiver unit for receiving said transmitted signals and for controlling current to said trigger servomotor means, said radio receiver unit comprising:
   programable central processing means;
   radio receiving circuit means connected to said central processing means for receiving said transmitted signals; and
   trigger servomotor control circuit means connected to said central processing means, for sequentially controlling current to said plurality of said trigger servomotor means in response to said transmitted signals.

18. A method of training retrieving and hunting dogs according to claims 17, wherein said signals are sequentially transmitted from said remote location to sequentially activate said plurality of said launch mechanisms using an electronic remote control unit comprising:
   a programmable central processing means;
   a radio transmitting means connected to said central processing means for generating said transmitted signals; and
   a switch means connected to said central processing means for activating said radio transmitting means.

19. A method of training retrieving and hunting dogs according to claim 17, comprising the further step of transmitting additional signals from a remote location to control the generation of sound from a sound generating means connected to said radio receiver unit, said sound generating means comprising sound control circuit means connected to said central processing means of said receiver unit and speaker means connected to said sound control circuit means.

20. A method of training retrieving and hunting dogs according to claim 19, comprising the further step of transmitting additional signals from a remote location to control a figure connected to said radio receiver unit, said figure comprising:
- a support means;
- a two-dimensional image rotatably mounted on said support means; and
- an image servomotor mounted on said support means, said image servomotor connected to said image for rotating said image in response to said transmitted signals.

21. A method of training retrieving and hunting dogs according to claim 20, wherein said radio receiver unit further comprises motion control circuit means connected to said central processing means, for sequentially controlling current to said image servomotor means in response to said transmitted signals.

22. A remote controlled launcher for launching retrieving dummies or birds for training retrieving and hunting dogs comprising:
- a ground engaging frame means;
- a support means connected to said frame means, said support means supporting a plurality of launch mechanisms;
- a plurality of launch control means mounted to said frame means for selectively activating said launch mechanisms;
- a sound generating means; and
- a radio receiving means connected to said launch control means and to said sound generating means for receiving transmitted signals from a remote location and for controlling said launch control means and said sound generating means,
- whereby retrieving dummies or birds mounted on said launch mechanisms may be sequentially launched and sound selectively generated by signals transmitted from a remote location by controlling current to said launch control means and said sound generation means in response to said transmitted signals.

23. A remote controlled launcher according to claim 22, wherein said sound generating means is capable of generating sounds selected from the group comprising gun shot sounds, duck sounds, pheasant sounds, grouse sounds, human voice sounds and siren sounds.

24. A remote controlled launcher according to claim 23, further comprising a remote controlled figure connected to said radio receiver unit, the movement of said figure controllable by signals transmitted from a remote location.

25. A remote controlled launcher according to claim 24 wherein said figure comprises:
- a support means;
- a two-dimensional image rotatably mounted on said support means; and
- an image servomotor mounted on said support means, said image servomotor connected to said image for rotating said image in response to said transmitted signals.

26. A remote controlled launcher according to claim 25, wherein said radio receiver unit comprises:
- programmable central processing means;
- radio receiving circuit means connected to said central processing means for receiving said transmitted signals;
- launch control circuit means connected to said central processing means, for sequentially controlling current to said plurality of said launch control means in response to said transmitted signals;
- sound control circuit means connected to said central processing means, for selectively controlling said sound generating means in response to said transmitted signals; and
- motion control circuit means connected to said central processing means, for sequentially controlling current to said image servomotor means in response to said transmitted signals.

27. A remote controlled launcher according to claim 26, further comprising an electronic remote control unit comprising:
- a programmable central processing means;
- a radio transmitting means connected to said central processing means for generating said transmitted signals; and
- a switch means connected to said central processing means for sequentially controlling the generation of said transmitted signals thereby enabling the sequential activation of said plurality of said launch mechanisms, the selective generation of sound from said sound generation means and the selective rotation of said figure, all from a remote location.

28. A system of a plurality of said remote controlled launchers each as set forth in claim 26, wherein there is also provided an electronic remote control unit comprising:
- a programmable central processing means;
- a radio transmitting means connected to said central processing means for generating said transmitted signals;
- a counting circuit means connected to said central processing means for counting the number of launches from each of said plurality of said launchers; and
- a plurality of switch means connected to said central processing means for programming said central processing means and for sequentially and selectively controlling the generation of said transmitted signals thereby enabling the selective activation of said plurality of said remote controlled launchers, the sequential activation of said plurality of said launch mechanisms, the selective generation of sound from said sound generation means and the selective rotation of said figure, all from a remote location.

29. A remote controlled launcher according to claim 28, wherein said central processing means of said radio receiver unit is programmable by said transmitted signals generated by said remote control unit.

30. A remote controlled launcher according to claim 22, wherein said support means is comprised of one or more plates, each plate being individually pivotable with respect to said frame means, and each plate supporting one or more launch mechanisms.

31. A remote controlled launcher according to claim 30, wherein the angular position of said plates with respect to said frame is individually adjustable by means of support bolts threadably connected to said plates and pivotably connected to said frame.

32. A remote controlled launcher for launching retrieving dummies or birds for training retrieving and hunting dogs comprising:
- a ground engaging frame means;
- a support means connected to said frame means, said support means supporting a plurality of launch mechanisms;

a plurality of launch control means mounted to said frame means for selectively activating said launch mechanisms;

a remote controlled figure; and a radio receiving means connected to said launch control means and to said remote controlled figure for receiving transmitted signals from a remote location and for controlling said launch control means and moving said remote controlled figure;

whereby retrieving dummies or birds mounted on said launch mechanisms may be sequentially launched and said figure selectively moved by signals transmitted from a remote location by controlling current to said launch control means and to said figure in response to said transmitted signals.

33. A remote controlled launcher according to claim 32, wherein said remote controlled figure comprises:

a support means;

a two-dimensional image rotatably mounted on said support means; and an image servomotor mounted on said support means, said image servomotor connected to said image for rotating said image in response to said transmitted signals from a remote location.

34. A remote controlled launcher according to claim 32, wherein said support means is comprised of one or more plates, each plate being individually pivotable with respect to said frame means, and each plate supporting one or more launch mechanisms.

35. A remote controlled launcher according to claim 34, wherein the angular position of said plates with respect to said frame is individually adjustable by means of support bolts threadably connected to said plates and pivotably connected to said frame.

36. A method of training retrieving and hunting dogs comprising the steps of:

positioning, in a remote location, a remote controlled launcher for launching retrieving dummies or birds comprising:

a ground engaging frame means, a support means connected to said frame means, said support means supporting a plurality of launch mechanisms, a plurality of launch control means mounted to said frame for selectively activating said launch mechanisms, a sound generating means, and radio receiver means connected to said launch control means and to said sound generating means for receiving transmitted signals from a remote location and for controlling said launch control means and said sound generating means;

mounting said retrieving dummies or birds on said launch mechanisms; and transmitting signals from a remote location to sequentially control current to said launch control means and said sound generating means to thereby sequentially launch said retrieving dummies or birds and selectively generate sounds.

37. A method of training retrieving and hunting dogs according to claim 36, comprising the further step of transmitting additional signals from a remote location to control a figure connected to said radio receiver unit, said figure comprising:

a support means;

a two-dimensional image rotatably mounted on said support means; and an image servomotor mounted on said support means, said image servomotor connected to said image for rotating said image in response to said transmitted signals.

38. A method of training retrieving and hunting dogs comprising the steps of:

positioning, in a remote location, a remote controlled launcher for launching retrieving dummies or birds comprising:

a ground engaging frame means, a support means connected to said frame means, said support means supporting a plurality of launch mechanisms, a plurality of launch control means mounted to said frame for selectively activating said launch mechanisms, a remote controlled figure, radio receiver means connected to said launch control means and to said figure for receiving transmitted signals from a remote location and for controlling said launch control means and moving said figure;

mounting said retrieving dummies or birds on said launch mechanisms; and transmitting signals from a remote location to sequentially control current to said launch control means and said figure to thereby sequentially launch said retrieving dummies or birds and selectively control the movement of said figure.

39. A method of training retrieving and hunting dogs according to claim 38, wherein said figure comprises:

a support means;

a two-dimensional image rotatably mounted on said support means; and an image servomotor mounted on said support means, said image servomotor connected to said image for rotating said image in response to said transmitted signals.

* * * * *